(12) United States Patent
Tojo

(10) Patent No.: US 8,220,338 B2
(45) Date of Patent: Jul. 17, 2012

(54) PRESSURE SENSOR AND MANUFACTURING METHOD

(75) Inventor: Hirofumi Tojo, Tokyo (JP)

(73) Assignee: Azbil Corporation, Tokyo (JP)

( * ) Notice: Subject to any disclaimer, the term of this patent is extended or adjusted under 35 U.S.C. 154(b) by 36 days.

(21) Appl. No.: 12/830,727

(22) Filed: Jul. 6, 2010

(65) Prior Publication Data

US 2011/0000304 A1 Jan. 6, 2011

(30) Foreign Application Priority Data

Jul. 6, 2009 (JP) ................................ 2009-159761

(51) Int. Cl.
*G01L 9/00* (2006.01)
(52) U.S. Cl. ........................................... 73/754; 73/592
(58) Field of Classification Search ............. 73/700–756
See application file for complete search history.

(56) References Cited

U.S. PATENT DOCUMENTS

| | | | |
|---|---|---|---|
| 4,766,666 A * | 8/1988 | Sugiyama et al. ........... 29/621.1 |
| 7,131,337 B2 | 11/2006 | Kato et al. | |
| 2005/0172724 A1 * | 8/2005 | Sakai et al. ..................... 73/754 |
| 2006/0027025 A1 * | 2/2006 | Ueno .............................. 73/715 |
| 2006/0288793 A1 * | 12/2006 | Tanaka ........................... 73/754 |

FOREIGN PATENT DOCUMENTS

| | | |
|---|---|---|
| CN | 1651886 | 8/2005 |
| JP | 10-30972 A | 2/1998 |
| JP | 11-248571 | 9/1999 |

OTHER PUBLICATIONS

An Office Action, dated Nov. 24, 2011, which issued during the prosecution of Chinese Application No. 201010220765.8, which corresponds to the present application.

* cited by examiner

*Primary Examiner* — Andre Allen
(74) *Attorney, Agent, or Firm* — McDermott Will & Emery LLP

(57) ABSTRACT

A semiconductor substrate, provided with a differential pressure diaphragm, and a glass pedestal, which is provided on the bottom side of the semiconductor substrate, are provided, wherein: the bottom surface of the semiconductor substrate and the top surface of the glass pedestal are bonded together; a pressure introducing hole is formed in the glass pedestal so as to pass through the glass pedestal, connecting between the top and bottom surfaces of the glass pedestal; the pressure introducing hole is formed with a first diameter for the pressure introducing hole at the bottom surface of the glass pedestal from the bottom surface of the glass pedestal to a first position; and a second diameter for the pressure introducing hole at the top surface of the glass pedestal is larger than the first diameter; where a metal thin film layer is deposited on the bottom surface of the glass pedestal.

6 Claims, 8 Drawing Sheets

(a)

(b)

(a)

(b)

PRESSURE SENSOR AND MANUFACTURING METHOD

CROSS REFERENCE TO RELATED APPLICATIONS

The present application claims priority under 35 U.S.C. §119 to Japanese Patent Application No. 2009-159761, filed Jul. 6, 2009, which is incorporated herein by reference.

FIELD OF TECHNOLOGY

The present invention relates to a pressure sensor and to a manufacturing method, and, in particular, relates to a pressure sensor having a diaphragm, and to a method for manufacturing that pressure sensor.

BACKGROUND OF THE INVENTION

Pressure sensors that use a semiconductor piezoresistance effect are small and light, and have high sensitivity, and thus are used broadly in fields such as industrial instrumentation and medicine. This type of pressure sensor includes a semiconductor substrate that is provided with a diaphragm portion, a glass pedestal wherein is formed a pressure introducing hole, and a metal base (a stem). Additionally, the semiconductor substrate is bonded to the top surface of the glass pedestal using an anode bonding method. Additionally, the metal base is bonded to the bottom surface of the glass pedestal through soldering.

Because solder has poor wettability with glass, normally a metal thin film layer (a metallization layer) is deposited on the bottom surface of the glass pedestal. The metal thin film layer is deposited on the bottom surface of the glass pedestal using a vapor deposition method or a sputtering method. The hole diameter of the pressure introducing hole in the glass pedestal is essentially uniform between the top and bottom surfaces of the glass pedestal, and thus at the time of the deposition of the metal thin film layer, a metal thin film layer is formed also on the side walls of the pressure introducing hole. Because of this, the solder wets also onto the portions of the side walls of the pressure introducing hole whereon the metal thin film layer is formed. In other words, the solder creeps up the side wall of the pressure introducing hole. Moreover, it is difficult to control the range over which the metal thin film layer is deposited onto the side wall of the pressure introducing hole. Because of this, it is difficult to control the height to which the solder creeps up the side wall portion of the pressure introducing hole. Moreover, it is possible for the solder to creep until it nears the semiconductor substrate. Doing so can affect the semiconductor substrate, such as causing stresses (thermal stresses) caused by differences in coefficients of thermal expansion between the solder and the semiconductor substrate. Additionally, these thermal stresses, and the like, may lead to defects in the characteristics of the semiconductor substrate.

Given this, Japanese Unexamined Patent Application Publication H10-030972 ("JP '972") describes a pressure sensor that uses a glass pedestal wherein a tapered pressure introducing hole has been formed. Specifically, the diameter of the pressure introducing hole gradually becomes larger towards the top surface of the glass pedestal from the bottom surface. This makes it possible to prevent the deposition of the metal thin film layer on the side walls of the pressure introducing hole when depositing the metal thin film layer on the bottom surface of the glass pedestal. This makes it possible to prevent the solder from creeping up the pressure introducing hole.

However, in the pressure sensor as set forth in JP '972, essentially no metal thin film layer is deposited on the side wall of the pressure introducing hole when depositing the metal thin film layer on the bottom surface of the glass pedestal using the sputtering method. Moreover, there is essentially no wetting of the side wall of the pressure introducing hole with solder. Because of this, it is possible that the strength of bonding between the glass pedestal and the metal base will be inadequate.

Furthermore, in the pressure sensor as set forth in JP '972, the excess solder will pool in the pressure introducing hole, so the pressure introducing hole may become blocked with solder.

The present invention is to solve these problems areas, and the object thereof is to provide a pressure sensor and manufacturing method capable of suppressing more effectively the occurrence of characteristic defects and capable of increasing the strength of bonding between the glass pedestal and the metal base.

SUMMARY OF THE INVENTION

A pressure sensor according to a first aspect according to the present invention is a pressure sensor including a semiconductor substrate that is provided with a diaphragm portion, and a glass pedestal that is provided on the bottom side of the semiconductor substrate. The bottom surface of the semiconductor substrate is bonded to the top surface of the glass pedestal. Moreover, a pressure introducing hole that passes through the glass pedestal between the top and bottom surfaces of the glass pedestal is formed in the glass pedestal. The pressure introducing hole is formed to a first position from the bottom surface of the glass pedestal with a first diameter for the pressure introducing hole at the bottom surface of the glass pedestal, and, at the top surface of the glass pedestal, a second diameter for the pressure introducing hole is greater than the first diameter. A metal thin film layer is formed on the bottom surface of the glass pedestal.

In the first aspect according to the present invention, the second diameter for the pressure introducing hole at the top surface of the glass pedestal is larger than the first diameter for the pressure introducing hole at the bottom surface of the glass pedestal. Because of this, it is possible to prevent the deposition of the metal thin film layer on the side walls of the pressure introducing hole on the semiconductor substrate side, even when depositing the metal thin film layer on the bottom surface of the glass pedestal. Doing so makes it possible to prevent the creeping of the solder on the side walls of the pressure introducing hole on the semiconductor substrate side. This makes it possible to suppress more effectively the characteristic defects that occur due to the creeping of the solder near to the semiconductor substrate.

Additionally, in the range up to the first position from the bottom surface of the glass pedestal, the diameter of the pressure introducing hole that is provided in the glass pedestal has an essentially uniform size. Because of this, when depositing the metal thin film layer on the bottom surface of the glass pedestal, the metal thin film layer will be deposited on the side walls of the pressure introducing hole in the range up to the first position from the bottom surface of the glass pedestal. Doing so causes the solder to wet the side walls of the pressure introducing hole in the range up to the first position from the bottom surface of the glass pedestal. Because of this, the glass pedestal will be bonded more reliably to the metal base that is provided on the bottom side of the glass pedestal. That is, this makes it possible to improve the strength of bonding between the glass pedestal and the metal base.

Additionally, the metal thin film layer preferably is deposited across at least one portion of the side wall from the bottom surface of the glass pedestal up to the first position on the side wall of the pressure introducing hole from the bottom surface of the glass pedestal.

Doing so can improve the strength of bonding between the glass pedestal and the metal base more reliably.

Additionally, preferably the pressure introducing hole is formed with a second diameter from the top surface of the glass pedestal to the second position.

Doing so causes the diameter of the pressure introducing hole, in the range from the top surface of the glass pedestal to the second position, to be larger than the diameter of the pressure introducing hole at the bottom surface of the glass pedestal. This makes it possible to prevent more reliably the deposition of the metal thin film layer on the side walls of the pressure introducing hole near the semiconductor substrate. In other words, this makes it possible to prevent more reliably the wetting of the solder on the side walls of the pressure introducing hole near the semiconductor substrate. Consequently, this is able to suppress even more effectively the characteristic defects in the pressure sensor.

Furthermore, a metal base is provided with the top surface thereof bonded, by solder, to the bottom surface of the glass pedestal, with the metal thin film layer interposed therebetween. A through hole portion is formed in the metal base so as to pass through the metal base, from the top surface to the bottom surface of the metal base, and so as to connect to the pressure introducing hole of the glass pedestal. Preferably the diameter of the through hole portion is larger than the first diameter of the pressure introducing hole.

When the glass pedestal and the metal base are bonded together using solder, the excess solder flows along the side walls of the through hole portion due to gravity. At this time, the diameter of the through hole portion is larger than the first diameter of the pressure introducing hole, thus making it possible to prevent the through hole portion from becoming blocked with solder.

Moreover, a through hole of a diameter of essentially the same size as the first diameter of the pressure introducing hole is formed in the metal thin film layer that is deposited on the bottom surface of the glass pedestal. Given this, the excess solder when the glass pedestal and the metal base are bonded together using solder forms a fillet at the step part between the through hole of the metal thin film layer and the through hole portion of the metal base. This makes it possible to further increase the strength of bonding between the top surface of the metal base and the bottom surface of the glass pedestal.

A method for manufacturing a pressure sensor according to a second aspect according to the present invention is a method for manufacturing a pressure sensor that includes a semiconductor substrate that is provided with a diaphragm portion, and a glass pedestal that is provided on the bottom side of the semiconductor substrate. The method for manufacturing the pressure sensor has a pressure introducing hole forming process, a metal thin film layer depositing process, and a glass pedestal bonding process. In the pressure introducing hole forming process, a pressure introducing hole is formed in the glass pedestal so as to pass through the glass pedestal, connecting between the top and bottom surfaces of the glass pedestal. In the metal thin film layer depositing process, a metal thin film layer is deposited on the bottom surface of the glass pedestal wherein the pressure introducing hole has been formed. In the glass pedestal bonding process, the bottom surface of the semiconductor substrate and the top surface of the glass pedestal are bonded together. Additionally, in the pressure introducing hole forming process, the pressure introducing hole is formed from the bottom surface of the glass pedestal to a first position with a first diameter for the pressure introducing hole at the bottom surface of the glass pedestal, and the pressure introducing hole is formed so that a second diameter for the pressure introducing hole at the top surface of the glass pedestal will be larger than the first diameter.

According to the second aspect according to the present invention, the pressure introducing hole is formed so that the second diameter of the pressure introducing hole at the top surface of the glass pedestal is larger than the first diameter of the pressure introducing hole at the bottom surface of the glass pedestal. Because of this, it is possible to prevent the deposition of the metal thin film layer on the side walls of the pressure introducing hole at the semiconductor substrate side, and even when the metal thin film layer is deposited on the bottom surface of the glass pedestal. This makes it possible to prevent the wetting of the solder on the side walls of the pressure introducing hole on the semiconductor substrate side. Because of this, it is possible to suppress more effectively characteristic defects that occur due to the wetting of the solder near the semiconductor substrate.

Additionally, the pressure introducing hole is formed so that the diameter of the pressure introducing hole provided in the glass pedestal has an essentially uniform size over the range from the bottom surface of the glass pedestal to the first position. Because of this, when depositing the metal thin film layer on the bottom surface of the glass pedestal, the metal thin film layer will be deposited on the side walls of the pressure introducing hole in the range from the bottom surface of the glass pedestal to the first position. This causes the solder to be wetted onto the side walls of the pressure introducing hole in the range from the bottom surface of the glass pedestal to the first position. Because of this, the glass pedestal is bonded more reliably by the solder to the metal base that is provided at the bottom side of the glass pedestal. In other words, this can increase the strength of bonding between the glass pedestal and the metal base.

Additionally, in the metal thin film layer depositing process the metal thin film layer more preferably is deposited across at least a portion of the range from the bottom surface of the glass pedestal to the first position on the side walls of the pressure introducing hole from the bottom surface of the glass pedestal.

Doing so makes it possible to increase more reliably the strength of bonding between the glass pedestal and the metal base.

Additionally, in the pressure introducing hole forming process, preferably the pressure introducing hole is formed with a second diameter from the bottom surface of the glass pedestal to the second position.

Doing so causes the diameter of the pressure introducing hole in the range from the top surface of the glass pedestal to the second position to be larger than the diameter of the pressure introducing hole at the bottom surface of the glass pedestal. This makes it possible to prevent more reliably the deposition of the metal thin film layer on the side walls of the pressure introducing hole near the semiconductor substrate. In other words, this makes it possible to prevent more reliably the wetting of the solder on the side walls of the pressure introducing hole near the semiconductor substrate. Consequently, this makes it possible to suppress more effectively the characteristic defects of the pressure sensor.

A metal base bonding process is also provided. In the metal base bonding process, the bottom surface of the glass pedestal and the top surface of the metal base are bonded together through solder with the metal thin film layer interposed therebetween. Moreover, a through hole portion is formed in the metal base so as to pass through the metal base, connecting between the top and bottom surfaces of the metal base, and so as to connect to the pressure introducing hole of the glass pedestal. Additionally, the diameter of the through hole portion preferably is larger than the first diameter of the pressure introducing hole.

When bonding the glass pedestal and the metal base together using solder, the excess solder flows along the side walls of the through hole portion due to gravity. At this time, the diameter of the through hole portion is larger than the first diameter of the pressure introducing hole, making it possible to prevent the through hole portion from becoming blocked with solder.

Furthermore, a through hole is formed with a diameter that is of essentially the same size as the first diameter of the pressure introducing hole in the metal thin film layer that is deposited on the bottom surface of the glass pedestal. When bonding the glass pedestal and the metal base together using solder, the excess solder forms a fillet at the step between the through hole of the metal thin film layer and the metal base. Because of this, it is possible to further increase the strength of bonding between the top surface of the metal base and the bottom surface of the glass pedestal.

The present invention is not only able to suppress more effectively the occurrence of characteristic defects, but also able to increase the strength of bonding between the glass pedestal and the metal base.

DETAILED DESCRIPTION OF THE INVENTION

A form of embodiment according to the present invention will be explained below in reference to the drawings.

Figure 1:
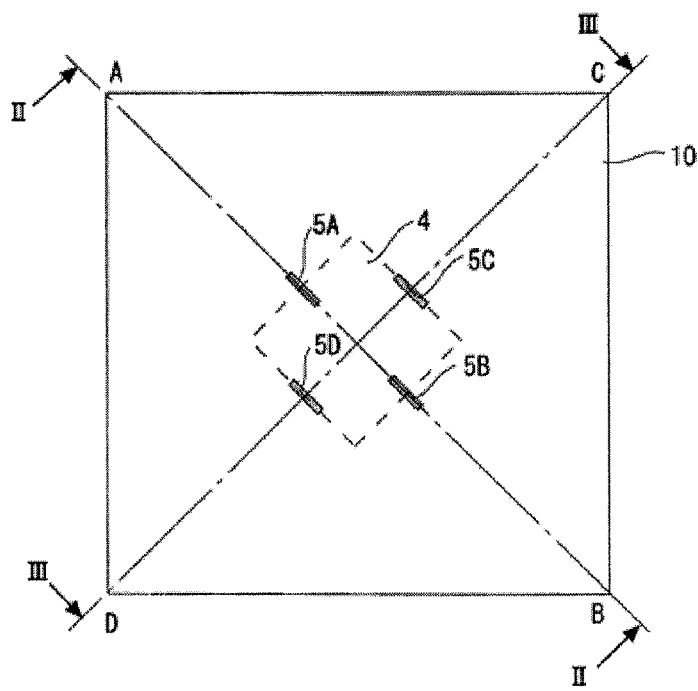
FIG. 1 is a top view illustrating the structure of a sensor chip according to an embodiment.
Figure 2:
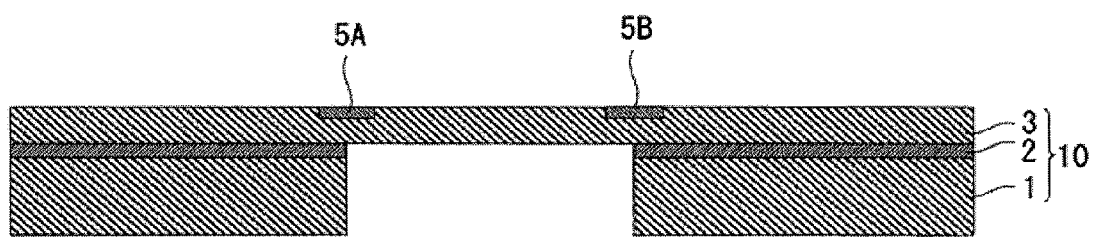
FIG. 2 is a cross-sectional diagram along the section II-II in FIG. 1.
Figure 3:
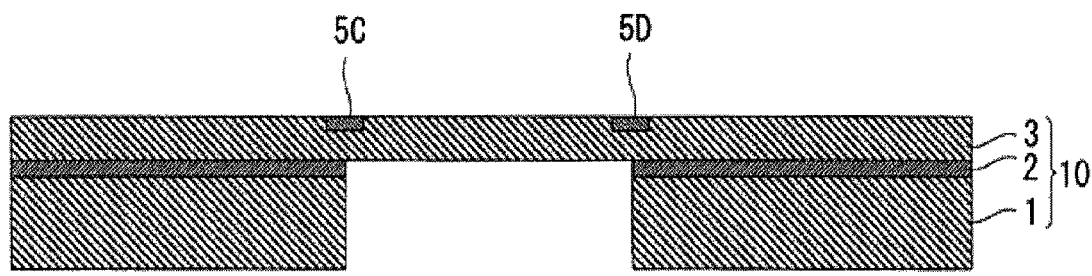
FIG. 3 is a cross-sectional diagram along the section III-III in FIG. 1.

In the below, a specific form of embodiment wherein the present invention is applied will be explained in detail while referencing the drawings. FIG. 1 is a top view illustrating the structure of a sensor chip 10 (a semiconductor substrate) used in a pressure sensor 100 according to the present form of embodiment. FIG. 2 is a cross-sectional diagram along the section II-II in FIG. 1, and FIG. 3 is a cross-sectional diagram along the section III-III. The pressure sensor 100 according to the present form of embodiment is a semiconductor sensor that uses the piezoresistance effect of semiconductors.

The pressure sensor 100 has a sensor chip 10 that is made out of a semiconductor substrate. The sensor chip 10 is a square shape. As illustrated in FIG. 1, the corners of the square sensor chip 10 are defined as A, B, C, and D. As illustrated in FIG. 1, the upper-left corner is defined as corner A, the lower-right corner is defined as corner B, the upper-right corner is defined as corner C, and the lower-left corner is defined as corner D. The diagonal line connecting corner A and corner B is defined as the diagonal line AB. The diagonal line connecting the corner C and the corner D is defined as the diagonal line CD. The sensor chip 10 is a square, and thus the diagonal line AB and the diagonal line CD bisect each other at right angles.

As illustrated in FIG. 2, the sensor chip 10 has a three-layer structure with a first semiconductor layer 1, which is a base, an insulating layer 2, and a second semiconductor layer 3. For example, an SOI (Silicon On Insulator) substrate, including a first semiconductor layer 1, an insulating layer 2 with a thickness of about 0.5 µm, and a second semiconductor layer 3, may be used as the sensor chip 10. The first semiconductor layer 1 and the second semiconductor layer 3 may be structured from, for example, n-type single crystal silicon layers. The insulating layer 2 may be structured from, for example, an $SiO_2$ layer. The insulating layer 2 is formed on top of the first semiconductor layer 1. Additionally, the second semiconductor layer 3 is formed on top of the insulating layer 2. Consequently, the insulating layer 2 is disposed between the first semiconductor layer 1 and the second semiconductor layer 3. The insulating layer 2 functions as an etching stopper when etching the first semiconductor layer 1. The second semiconductor layer 3 structures a differential pressure diaphragm 4 (diaphragm portion). As illustrated in FIG. 2, the differential pressure diaphragm 4 is disposed in the center part of the chip.

The differential pressure diaphragm 4, for detecting a differential pressure, is disposed in the center part of the sensor chip 10. As illustrated in FIG. 2, the differential pressure diaphragm 4 is formed by removing the first semiconductor layer 1. That is, the sensor chip 10 is thinned at the differential pressure diaphragm 4. As illustrated in FIG. 1, here the differential pressure diaphragm 4 is formed in the shape of a square. Additionally, the center of the differential pressure diaphragm 4 is coincident with the center of the sensor chip 10. That is, the center point of the sensor chip 10 is on the point of intersection between the diagonal line AB and the diagonal line CD. Additionally, the differential pressure diaphragm 4 is disposed angled at 45° relative to the square sensor chip 10. Consequently, the diagonal line AB passes perpendicularly through the center of two opposing edges of the differential pressure diaphragm 4. Additionally, the diagonal line CD passes perpendicularly through the centers of the other two opposing edges of the differential pressure diaphragm 4.

Differential pressure gauges 5A through 5D are disposed on the surface of the differential pressure diaphragm 4. These four differential pressure gauges 5A through 5D are referred to, in aggregate, as the differential pressure gauges 5. The differential pressure gauges 5 are disposed at the edge portions of the differential pressure diaphragm 4. That is, the differential pressure gauges 5 are formed on the peripheral edge portions of the differential pressure diaphragm 4. A differential pressure gauge 5 is disposed in the center of each edge of the differential pressure diaphragm 4. Consequently, the differential pressure gauge 5A is disposed between the center of the differential pressure diaphragm 4 and the corner A. The differential pressure gauge 5B is disposed between the center of the differential pressure diaphragm 4 and the corner B, the differential pressure gauge 5 C is disposed between the center of the differential pressure diaphragm 4 and the corner C, and the differential pressure gauge 5D is disposed between the center of the differential pressure diaphragm 4 and the corner D. The differential pressure gauge 5A and the differential pressure gauge 5B face each other with the center of the sensor chip 10 therebetween. The differential pressure gauge 5C and the differential pressure gauge 5D facing each other with the center of the sensor chip 10 therebetween.

The differential pressure gauges 5 are strain gauges having the piezoresistance effect. Consequently, when the sensor chip 10 deforms, the resistances of each of the differential pressure gauges 5A through 5D will change. Note that, on the top surface of the sensor chip, interconnections (not shown) are formed connecting the individual differential pressure gauges 5A through 5D. For example, interconnections are connected to both ends of each of the differential pressure gauges 5A through 5D. The four differential pressure gauges 5 are connected in a bridge circuit by these interconnections. The differential pressure diaphragm 4 deforms due to a pressure differential between the spaces partitioned by the differential pressure diaphragm 4. In the differential pressure gauges 5, the resistances vary in accordance with the amount of deformation of the differential pressure diaphragm 4. The pressure can be measured by detecting these variations in the resistances. The differential pressure gauges 5 are formed on the surface of the sensor chip 10 as illustrated in FIG. 2 and FIG. 3.

The four differential pressure gauges 5A through 5D are disposed in parallel with each other. That is, the lengthwise directions of the four differential pressure gauges 5A through 5D are disposed along the diagonal line AB. Additionally, interconnections (not shown) are connected to both ends of the differential pressure gauges 5A through 5D in the lengthwise direction. The differential pressure gauges 5 are formed in the parallel to the <110> crystal axial direction wherein the piezoresistance factor is maximized in the (100) crystal face orientation of the sensor chip 10.

Figure 4:
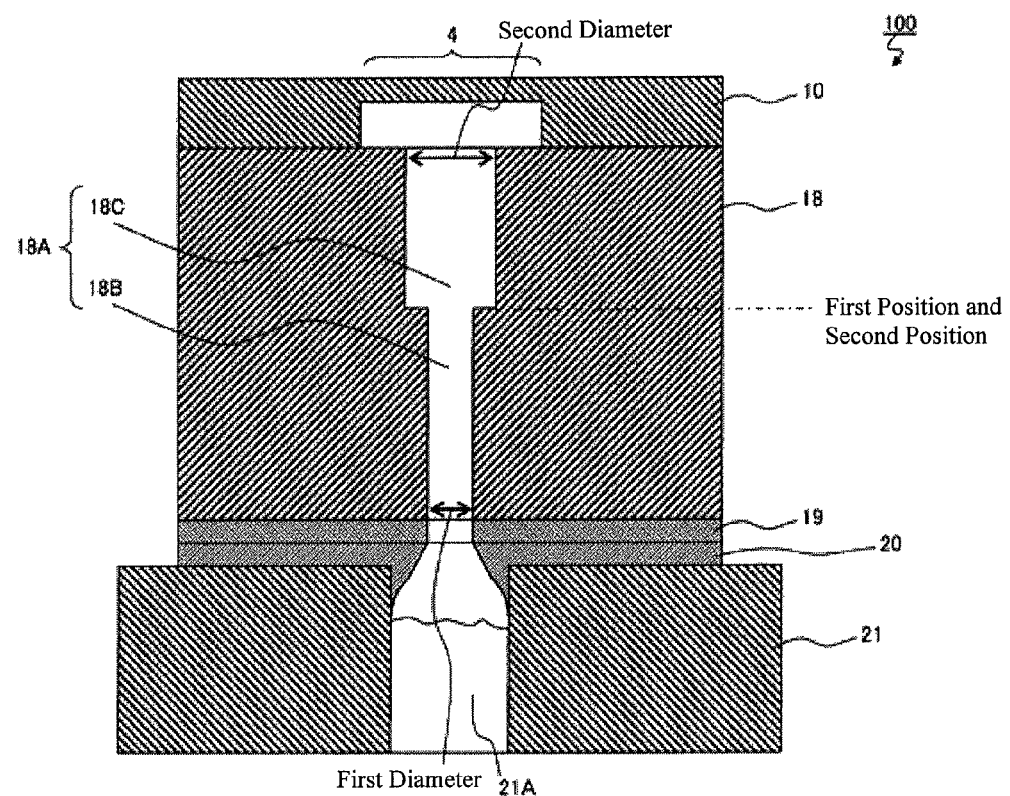
FIG. 4 is a cross-sectional diagram illustrating the structure of a pressure sensor according to the embodiment.

The pressure sensor 100 according to the present form of embodiment will be explained next in reference to FIG. 4. FIG. 4 shows a cross-sectional diagram of the pressure sensor 100. The pressure sensor 100, as illustrated in FIG. 4, comprises the sensor chip 10, a glass pedestal 18, and a metal base 21.

For the glass pedestal 18, the bottom surface of the sensor chip 10 and the top surface of the glass pedestal 18 are bonded together. Additionally, the glass pedestal 18 is formed from, for example, Pyrex glass (registered trademark) or a ceramic. Furthermore, the glass pedestal 18 is bonded to the sensor chip 10 using, for example, can anode bonding method.

A pressure introducing hole 18A is formed in the glass pedestal 18 so as to pass through the glass pedestal 18, connecting between the top and bottom surfaces of the glass pedestal 18. Additionally, the pressure introducing hole 18A is formed in a position corresponding to the differential pressure diaphragm 4 of the sensor chip 10. Additionally, the pressure introducing hole 18A is connected to a recessed portion that is formed in a position that corresponds to the differential pressure diaphragm 4 of the sensor chip 10.

Here the diameter of the pressure introducing hole 18A at the bottom surface of the glass pedestal 18 is defined as the first diameter. Additionally, the diameter of the pressure introducing hole 18A on the top surface of the glass pedestal 18 is defined as the second diameter. At this time, the second diameter of the pressure introducing hole 18A is larger than the first diameter. Specifically, the pressure introducing hole 18A is formed with the first diameter from the bottom surface of the glass pedestal 18 to a first position. Furthermore, the pressure introducing hole 18A is formed with the second diameter from the top surface of the glass pedestal 18 to the second position. As illustrated in FIG. 4, in the present form of embodiment the first position of the glass pedestal 18 and the second position of the glass pedestal 18 are coincident. That is to say, the pressure introducing hole 18A is formed through mutually connecting a first hole portion 18B and a second hole portion 18C. The first hole portion 18B is formed with the first diameter from the bottom surface of the glass pedestal 18 to the first position. The second hole portion 18C is formed with the second diameter from the top surface of the glass pedestal 18 to the second position.

Additionally, a metal thin film layer 19 is deposited on the bottom surface of the glass pedestal 18. The metal thin film layer 19 is deposited on the bottom surface of the glass pedestal 18 using a vapor deposition method or a sputtering method. In the present form of embodiment, the metal thin film layer 19 is deposited on the bottom surface of the glass pedestal 18 using a sputtering method that has superior linearity of travel of the metal particles. Although the sputtering method has superior linearity of travel of the metal particles, when the metal thin film layer 19 is deposited on the bottom surface of the glass pedestal 18, the metal thin film layer will be deposited slightly on the side walls of the pressure introducing hole 18A. However, in the pressure sensor 100 according to the present form of embodiment the pressure introducing hole 18A is formed from the first hole portion 18B, having the first diameter, at the bottom side of the glass pedestal 18 and from the second hole portion 18C, having the second diameter, which is larger than the first diameter, at the top side of the glass pedestal 18. Because of this, even though the metal thin film layer will be formed slightly on the side walls of the first hole portion 18B when the metal thin film layer 19 is deposited on the bottom surface of the glass pedestal 18, there will be essentially no metal thin film layer deposited on the side walls of the second hole portion 18C.

Furthermore, a through hole, having a diameter that is of essentially an identical size to that of the first diameter of the pressure introducing hole 18A is formed in the metal thin film layer 19 at a position corresponding to the pressure introducing hole 18A of the glass pedestal 18.

The metal base 21 is disposed on the bottom side of the glass pedestal 18. Additionally, the top surface of the metal base 21 is bonded, through solder, to the bottom surface of the glass pedestal 18 with the metal thin film layer 19 interposed therebetween. In other words, the metal thin film layer 19 and a solder layer 20 are formed between the bottom surface of the glass pedestal 18 and the top surface of the metal base 21.

Additionally, a through hole portion 21A, which passes through the metal base 21, connecting between the top surface and the bottom surface of the metal base 21, is formed in the metal base 21. Furthermore, the through hole portion 21A is formed in a position corresponding to the pressure introducing hole 18A of the glass pedestal 18. The through hole portion 21A is connected to the pressure introducing hole 18A of the glass pedestal 18.

The diameter of the through hole portion 21A is larger than the first diameter of the pressure introducing hole 18A.

When the glass pedestal 18 and the metal base 21 are bonded together using solder, the excess solder flows into the through hole of the metal thin film layer 19, the pressure introducing hole 18A of the glass pedestal 18, and the through hole portion 21A of the metal base 21.

Here the wettability between the solder and the glass is poor, and thus the solder is wetted onto the parts wherein the thin film layer is formed on the side walls of the first hole portion 18B of the pressure introducing hole 18A. On the other hand, in the second hole portion 18C of the pressure introducing hole 18A, essentially no thin film layer has been deposited, and thus there is no wetting of the solder. Note that the deposition of the metal thin film layer onto the second hole portion 18C of the pressure introducing hole 18A can be prevented even if the second diameter is only slightly larger than the first diameter. Additionally, the distance from the bottom surface of the glass pedestal 18 to the first position (that is, the length of the first hole portion 18B) is a distance that is optimized based on, for example, the film thickness of the metal thin film layer 19 that is deposited on the bottom surface of the glass pedestal 18.

Additionally, when the glass pedestal 18 and the metal base 21 are bonded together using solder, the excess solder wets into the through hole portion 21A of the metal base 21 in accordance with the force of gravity. At this time, the diameter of the through hole in the metal thin film layer 19 is of essentially identical size to the first diameter of the pressure introducing hole 18A. Because of this, the diameter of the through hole of the metal thin film layer 19 is smaller than the diameter of the through hole portion 21A of the metal base 21. Consequently, a step is formed between the metal thin film layer 19 and the metal base 21. Because of this, when the glass pedestal 18 and the metal base 21 are bonded together using solder, the excess solder not only flows in accordance with the force of gravity, but also forms a fillet in the step portion.

Figure 5:
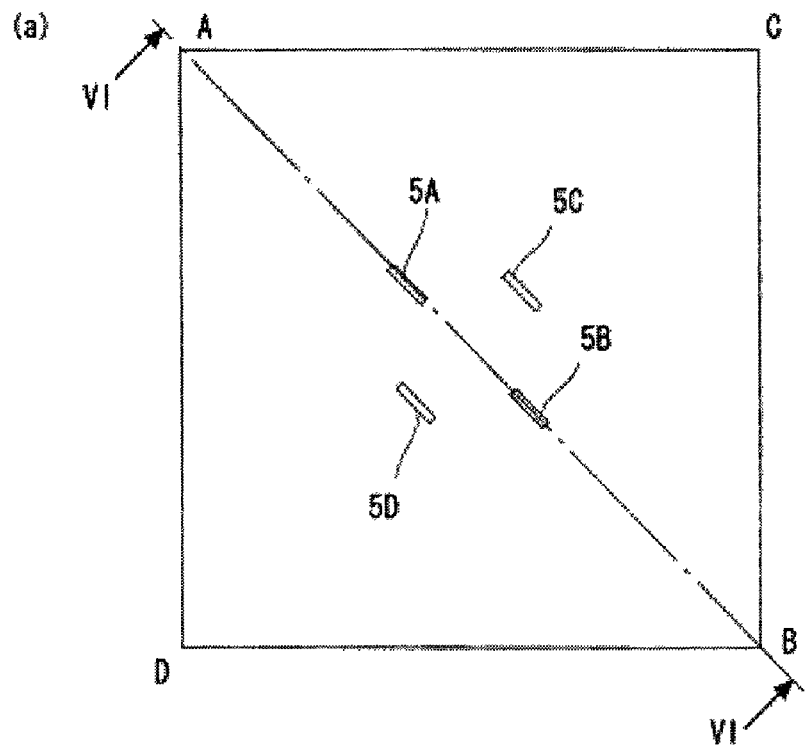
FIG. 5 is a diagram illustrating a manufacturing process for a sensor chip according to the embodiment.
Figure 5:
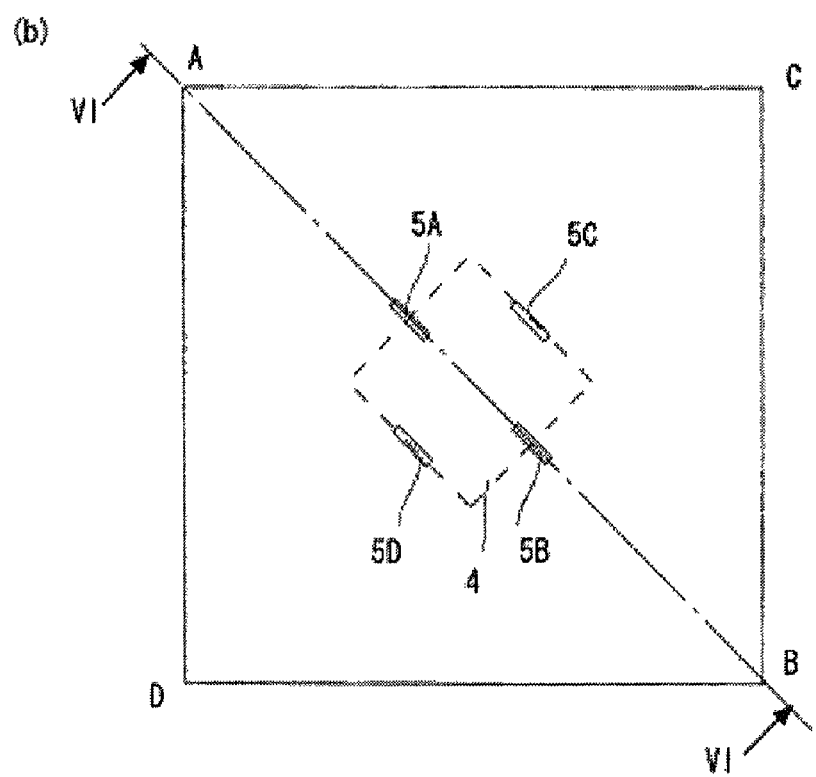
Figure 6:
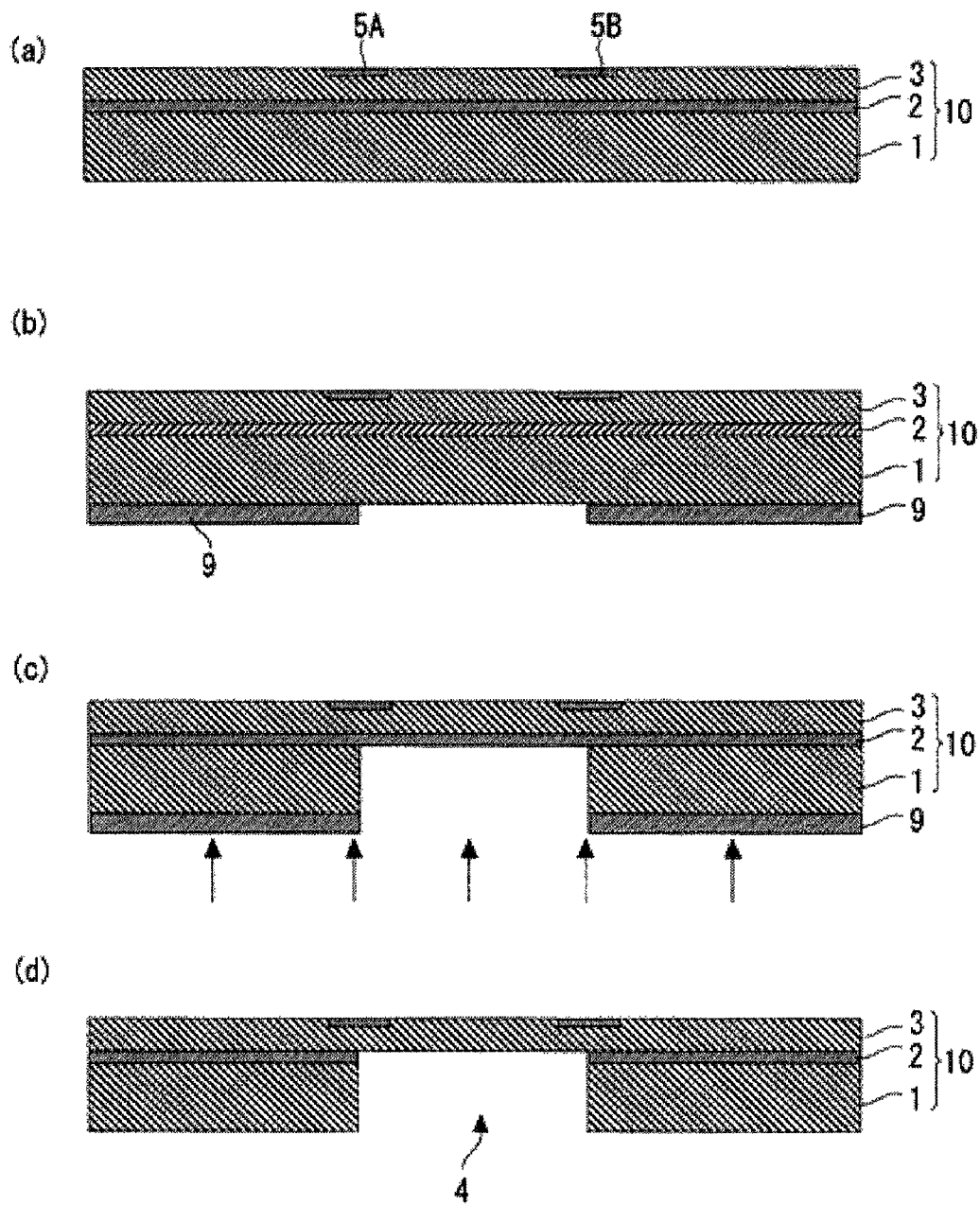
FIG. 6 is a manufacturing process cross-sectional diagram illustrating a manufacturing process for a sensor chip according to the embodiment.

The method for manufacturing the sensor chip 10 will be explained next using FIG. 5 and FIG. 6. FIG. 5 is a diagram illustrating a method for manufacturing the sensor chip 10, and shows the structure when the sensor chip 10 is viewed from above. FIG. 6 is a process cross-sectional diagram illustrating a method for manufacturing the sensor chip 10, showing the structure of section VI-VI in FIG. 5.

First an SOI (Silicon on Insulator) wafer is prepared comprising a first semiconductor layer 1, an insulating layer 2 with a thickness of about 0.5 µm, and a second semiconductor layer 3. In manufacturing this SOI wafer, the SIMOX (Separation by IMplanted OXygen) technology wherein an $SiO_2$ layer is formed through implanting oxygen into a silicon substrate, may be used, the SDB (Silicon Direct Bonding) technology wherein two selecting substrates are bonded together, may be used, or another method may be used. Note that the second semiconductor layer 3 may be planarized and thinned. For example, the second semiconductor layer 3 may be polished the to a specific thickness using a polishing method known as CCP (Computer-Controlled Polishing).

The differential pressure gauges 5A through 5D are formed from p-type silicon, through an impurity diffusing method or an ion implantation method, on the top surface of the second semiconductor layer 3. Doing so forms the structure illustrated in FIG. 5 (*a*) and FIG. 6 (*a*). As illustrated in FIG. 1, and the like, each gauge is formed in a specific position of the location that will form each diaphragm. Note that the differential pressure gauges 5A through 5D may instead be formed after the diaphragm forming process set forth below.

A resist 9 is formed on the bottom surface of the SOI wafer that is fabricated in this way. The pattern of the resist 9 is formed on the first semiconductor layer 1 through a well-known photolithography process. That is, a photosensitive resin layer is coated, exposed, and developed to form a pattern in the resist 9. The resist 9 has opening portions at parts that correspond to the pressure sensitive regions (the regions wherein the diaphragms will be formed). That is, the first semiconductor layer 1 is exposed in the parts wherein the diaphragms will be formed. Doing so forms the structure illustrated in FIG. 6 (*b*).

The first semiconductor layer 1 is etched using the resist 9 as a mask. Doing so forms the structure illustrated in FIG. 5 (*b*) and FIG. 6 (*c*). Dry etching, for example, the well-known ICP etching, or the like, may be used to etch the first semiconductor layer 1. Of course, the first semiconductor layer 1 may instead be etched using a wet etching method that uses a solution such as KOH or TMAH. The differential pressure diaphragm 4 is formed when the first semiconductor layer is etched. Here the insulating layer 2 functions as an etching stopper. Consequently, the insulating layer 2 is exposed in the opening portions of the resist 9.

The structure illustrated in FIG. 6 (*d*) is formed when the resist 9 and the insulating layer 2 of the diaphragm portion 4 are removed. The interconnections (not shown) for achieving electrical connections between the differential pressure gauges 5 are deposited using vapor deposition. Doing so forms the sensor chip 10. Note that the process for forming the interconnections may be performed instead prior to FIG. 6 (*d*). For example, the interconnections may be formed prior to FIG. 6 (*a*), or may be formed between FIG. 6 (*a*) and FIG. 6 (*c*). Additionally, as described above, the formation of the differential pressure gauges 5 may be performed after FIG. 6 (*d*), or may be performed between FIG. 6 (*a*) and FIG. 6 (*d*). That is, there is no particular limitation to the sequence of the interconnection forming process and the strain gauge forming process.

Figure 7:
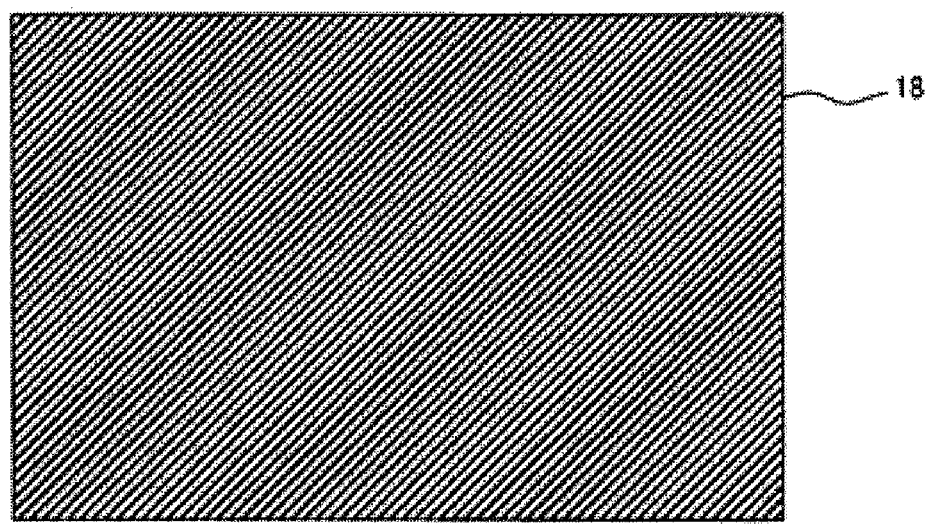
FIG. 7 is a manufacturing process cross-sectional diagram illustrating a manufacturing process for a pressure sensor according to the embodiment.
Figure 7:
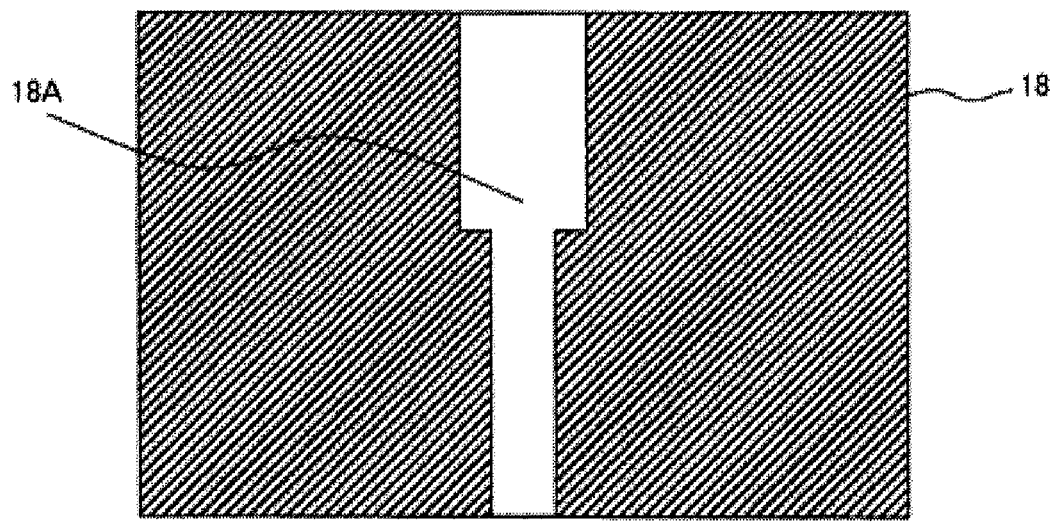
Figure 8:
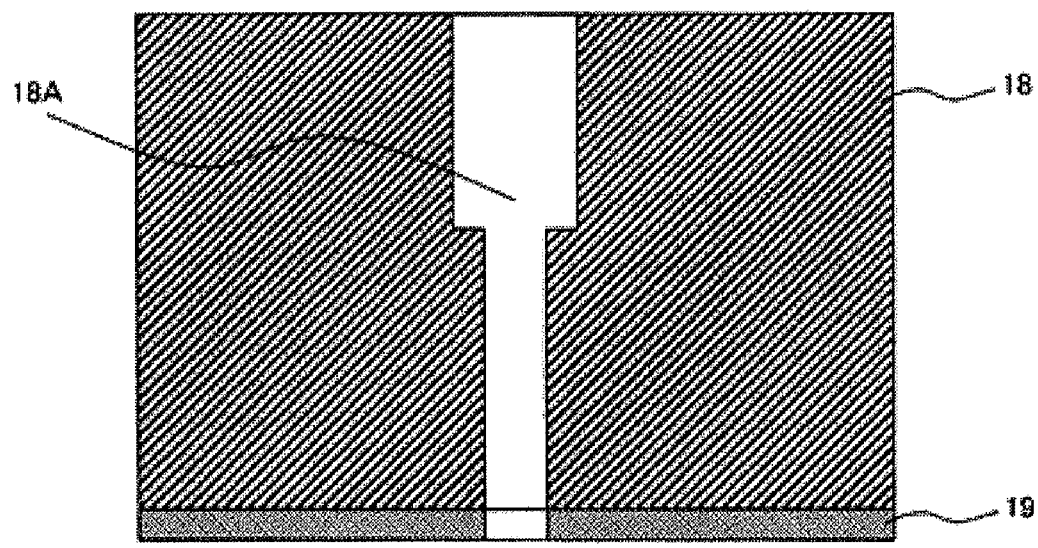
FIG. 8 is a manufacturing process cross-sectional diagram illustrating a manufacturing process for a pressure sensor according to the embodiment.
Figure 8:
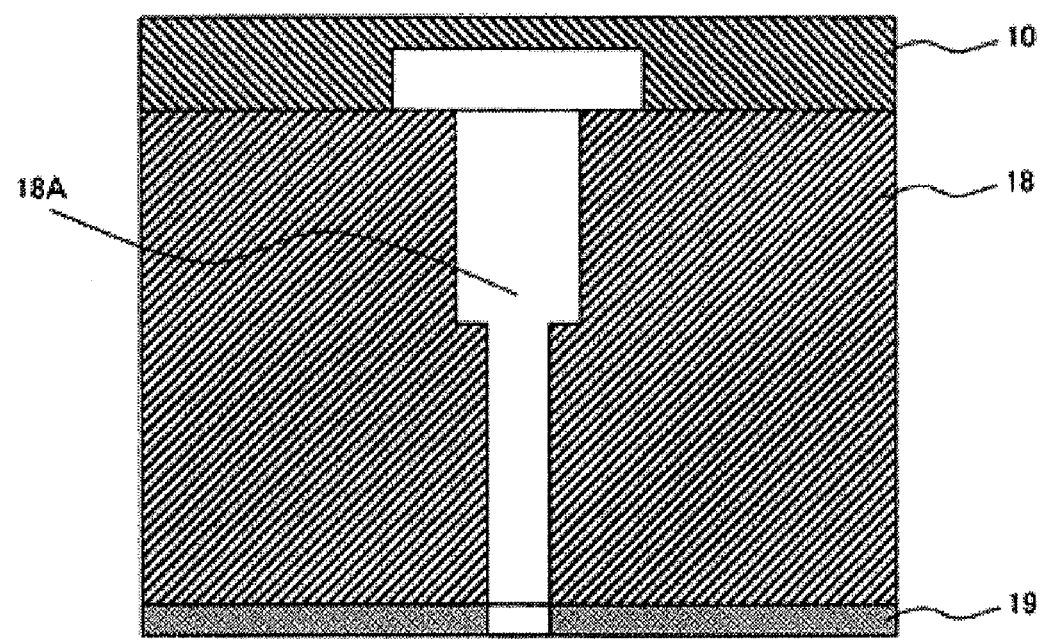
Figure 9:
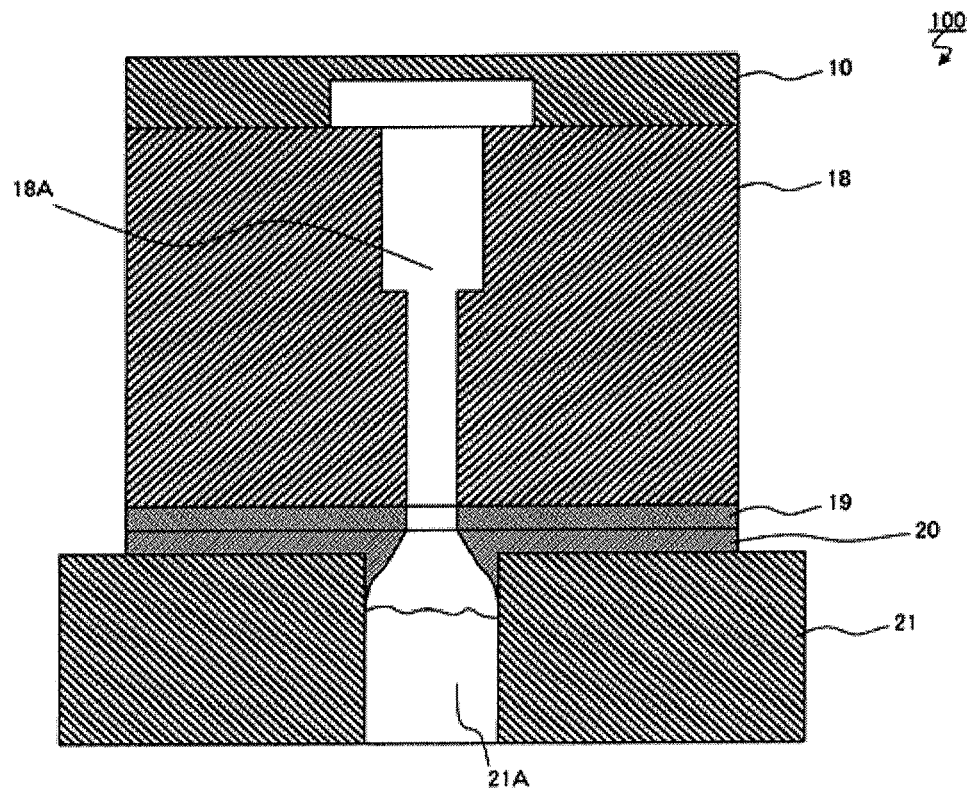
FIG. 9 is a manufacturing process cross-sectional diagram illustrating a manufacturing process for a pressure sensor according to the embodiment.

The method for manufacturing the pressure sensor 100 will be explained next using FIG. 7 through FIG. 9. FIG. 7 through FIG. 9 are processed cross-sectional diagrams illustrating a method for manufacturing the pressure sensor 100.

First, as illustrated in FIG. 7 (*a*), a substrate that will become the glass pedestal 18 is prepared. A flat substrate of, for example, Pyrex glass (registered trademark) or ceramic, or the like, is used for the substrate. The pressure introducing hole 18A is then formed in the glass pedestal 18 (the pressure introducing hole forming process). That is, a circular pressure introducing hole 18A that passes through the glass pedestal 18 is formed in the center of the glass pedestal 18. Doing so forms the structure illustrated in FIG. 7 (*b*). The pressure introducing hole 18A may be formed through, for example, a drilling process, or may be formed through a sandblasting process from both sides.

Following this, the metal thin film layer 19 is deposited onto the bottom surface of the glass pedestal 18 (the metal thin film layer depositing process), as illustrated in FIG. 8 (*a*). The metal thin film layer 19 may be deposited using a vapor deposition process or a sputtering process. In the present form of embodiment the metal thin film layer 19 is deposited on the bottom surface of the glass pedestal 18 using a sputtering process.

Following this, as illustrated in FIG. 8 (*b*), the sensor chip 10 and the glass pedestal 18 are bonded together (the glass pedestal bonding process). The glass pedestal 18 may be bonded to the semiconductor substrate layer 1 of the sensor chip 10 using anode bonding, for example. The pressure introducing hole 18A is formed connected to a recessed portion that is formed in the position corresponding to the differential pressure diaphragm 4 in the center of the glass pedestal 18.

Following this, as illustrated in FIG. 9, the bottom surface of the glass pedestal 18 and the top surface of the metal base 21 are bonded together using solder (the metal base bonding process). The metal thin film layer 19 is formed on the bottom surface of the glass pedestal 18, and thus doing so forms a solder layer 20 between the metal thin film layer 19 and the top surface of the metal base 21. The manufacturing of the pressure sensor 100 is completed in this way. The pressure sensor fabricated in this way is small and has high performance.

In the pressure sensor 100 according to the embodiment according to the present invention, the second diameter of the pressure introducing hole 18A at the top surface of the glass pedestal 18 is larger than the first diameter of the pressure introducing hole 18A at the bottom surface of the glass pedestal 18. Because of this, it is possible to prevent the deposition of the metal thin film layer on the side walls the sensor chip 10 side of the pressure introducing hole 18A, even when depositing the metal thin film layer 19 on the bottom surface of the glass pedestal 18. Doing so makes it possible to prevent the wetting of the solder onto the side walls of the sensor chip 10 side of the pressure introducing hole 18A. Because of that, it is possible to suppress more effectively characteristic defects that are produced through the wetting of the solder near the sensor chip 10.

Additionally, in the range from the bottom surface of the glass pedestal 18 to the first position, the diameter of the pressure introducing hole 18A that is provided in the glass pedestal has an essentially uniform size. Because of this, when the metal thin film layer 19 is deposited on the bottom surface of the glass pedestal 18, the metal thin film layer will be deposited on the side walls of the pressure introducing hole 18A in the range from the bottom surface of the glass pedestal 18 to the first position. Doing so causes the solder to wet onto the side walls of the pressure introducing hole 18A in the range from the bottom surface of the glass pedestal 18 to the first position. Because of this, the glass pedestal 18 will be bonded more reliably, by the solder, to the metal base 21 that is provided at the bottom side of the glass pedestal 18. That is, it is possible to improve the strength of bonding between the glass pedestal 18 and the metal base 21.

Additionally, the pressure introducing hole 18A is formed with the second diameter from the top surface of the glass pedestal 18 to the second position.

As a result, the diameter of the pressure introducing hole 18A, in the range from the top surface of the glass pedestal 18 to the second position, is larger than the diameter of the pressure introducing hole 18A at the bottom surface of the glass pedestal 18. As a result, it is possible to prevent more reliably the deposition of the metal thin film layer on the side walls of the pressure introducing hole 18A near the sensor chip 10. In other words, it is possible to prevent more reliably the wetting of the solder on the side walls of the pressure introducing hole 18A near the sensor chip 10. Consequently, it is possible to suppress even more reliably the characteristic defects in the pressure sensor 100.

A metal base 21, having the top surface thereof bonded, through solder, to the bottom surface of the glass pedestal 18, with the metal thin film layer 19 interposed therebetween, is also provided. A through hole portion 21A is formed in the metal base 21 so as to pass through the metal base 21, connecting between the top and bottom surfaces of the metal base 21, and so as to connect to the pressure introducing hole 18A of the glass pedestal 18. The diameter of the through hole portion 21A is larger than the first diameter of the pressure introducing hole 18A.

When the glass pedestal 18 and the metal base 21 are bonded together using solder, the excess solder flows along the side walls of the through hole portion 21A due to gravity. At this time, the diameter of the through hole portion 21A is larger than the first diameter of the pressure introducing hole 18A, and thus this is able to prevent the through hole portion 21A from becoming blocked with solder.

Moreover, a through hole of a diameter that is essentially equal in size to the first diameter of the pressure introducing hole 18A is formed in the metal thin film layer 19 that is deposited on the bottom surface of the glass pedestal 18. Additionally, when the glass pedestal 18 and the metal base 21 are bonded together using solder, the excess solder forms a fillet at the step portion between the through hole of the metal thin film layer 19 and the through hole portion 21A of the metal base 21. Because of this, it is possible to improve the strength of bonding between the top surface of the metal base 21 and the bottom surface of the glass pedestal 18.

Figure 10:
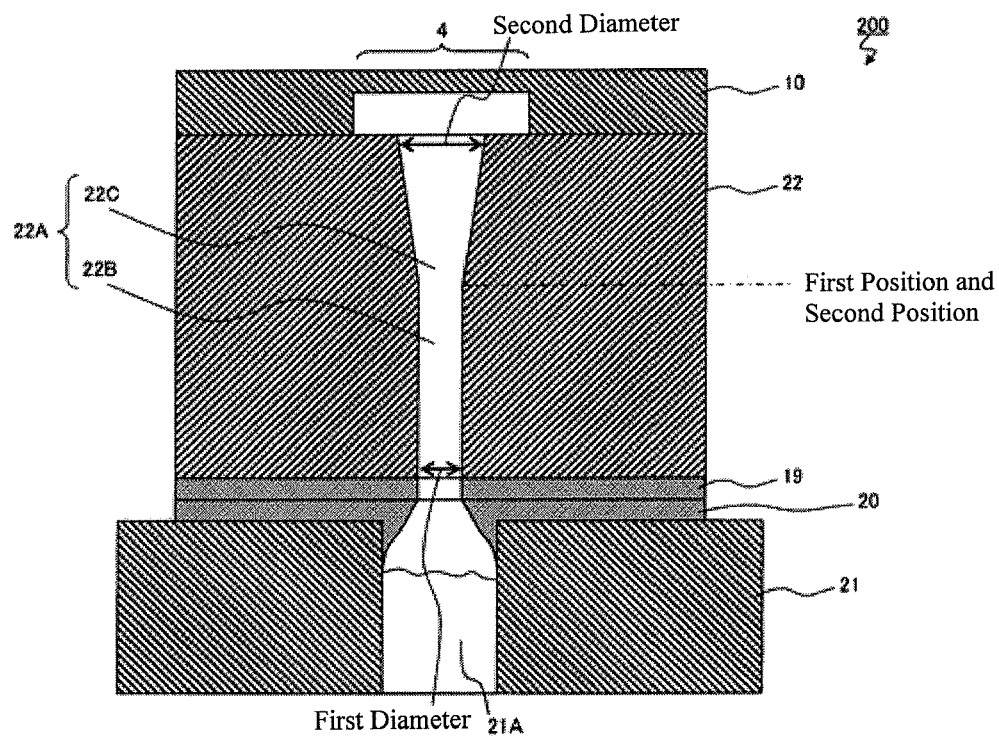
FIG. 10 is a cross-sectional diagram illustrating the structure of a pressure sensor according to another embodiment.

A pressure sensor 200 according to another embodiment according to the present invention will be explained in reference to FIG. 10. FIG. 10 is a cross-sectional diagram illustrating the structure of the pressure sensor 200. As illustrated in FIG. 10, the pressure sensor 200 according to this embodiment is different from the pressure sensor 100 according to the above embodiment in only the structure of the glass pedestal 22, and thus identical codes are assigned to the identical structures, and explanations thereof are omitted.

For the glass pedestal 22, the bottom surface of the sensor chip 10 and the top surface of the glass pedestal 22 are bonded together. Additionally, the glass pedestal 22 is formed from Pyrex glass (registered trademark) or a ceramic, or the like. The glass pedestal 22 is bonded to the sensor chip 10 using, for example, an anode bonding method.

Additionally, a pressure introducing hole 22A is formed in the glass pedestal 22 so as to pass through the glass pedestal 22, connecting between the top and bottom surfaces of the glass pedestal 22. Additionally, the pressure introducing hole 22A is formed in a location corresponding to the differential pressure diaphragm 4 of the sensor chip 10. The pressure introducing hole 22A connects with a recessed portion that is formed in a position that corresponds to the differential pressure diaphragm 4 of the sensor chip 10.

Here the diameter of the pressure introducing hole 22A at the bottom surface of the glass pedestal 22 is defined as the first diameter. Additionally, the diameter of the pressure introducing hole 22A at the top surface of the glass pedestal 22 is defined as the second diameter. At this time, the second diameter of the pressure introducing hole 22A is larger than the first diameter. Specifically, the pressure introducing hole 22A is formed with the first diameter from the bottom surface of the glass pedestal 22 to a first position. Additionally, the pressure introducing hole 22A is formed, from the top surface of the glass pedestal 22 to the second position, so that the diameter of the pressure introducing hole 22A gradually narrows from the second diameter to become the first diameter. Additionally, as illustrated in FIG. 10, in the present form of embodiment, the first position in the glass pedestal 22 is coincident with the second position in the glass pedestal 22. In other words, the pressure introducing hole 22A is structured from a mutually connected first hole portion 22B and second hole portion 22C. Additionally, the first hole portion 22B is formed with the first diameter from the bottom surface of the glass pedestal 22 to the first position. Furthermore, the second hole portion 22C is formed, from the top surface of the glass pedestal 22 to the second position such that the diameter of the pressure introducing hole 22A narrows gradually from the second diameter to become the first diameter.

Additionally, a metal thin film layer 19 is deposited on the bottom surface of the glass pedestal 22. The metal thin film layer 19 is deposited on the bottom surface of the glass pedestal 22 using a vapor deposition method or a sputtering method. In the present form of embodiment, the metal thin film layer 19 is deposited on the bottom surface of the glass pedestal 22 using a sputtering method that has superior linearity of travel of the metal particles. Although the sputtering method has superior linearity of travel of the metal particles, when the metal thin film layer 19 is deposited on the bottom surface of the glass pedestal 22, the metal thin film layer will be deposited slightly on the side walls of the pressure introducing hole 22A. However, in the pressure sensor 200 according to the present form of embodiment the pressure introducing hole 22A is formed from the first hole portion 22B, having the first diameter, at the bottom side of the glass pedestal 22 and from the second hole portion 22C, having a diameter that is larger than the first diameter, at the top side of the glass pedestal 22. Because of this, even though the metal thin film layer will be formed slightly on the side walls of the first hole portion 22B when the metal thin film layer 19 is deposited on the bottom surface of the glass pedestal 22, there will be essentially no metal thin film layer deposited on the side walls of the second hole portion 22C. Note that the deposition of the metal thin film layer onto the second hole portion 22C of the pressure introducing hole 22A can be prevented even if the second diameter is only slightly larger than the first diameter. Additionally, the distance from the bottom surface of the glass pedestal 22 to the first position (that is, the length of the first hole portion 22B) is a distance that is optimized based on, for example, the film thickness of the metal thin film layer 19 that is deposited on the bottom surface of the glass pedestal 22.

The pressure sensor 200 and set forth in this embodiment, through structuring the pressure introducing hole 22A of the glass pedestal 22 in this way, can produce the same effects as does the pressure sensor 100 as set forth in the first form of embodiment.

Figure 11:
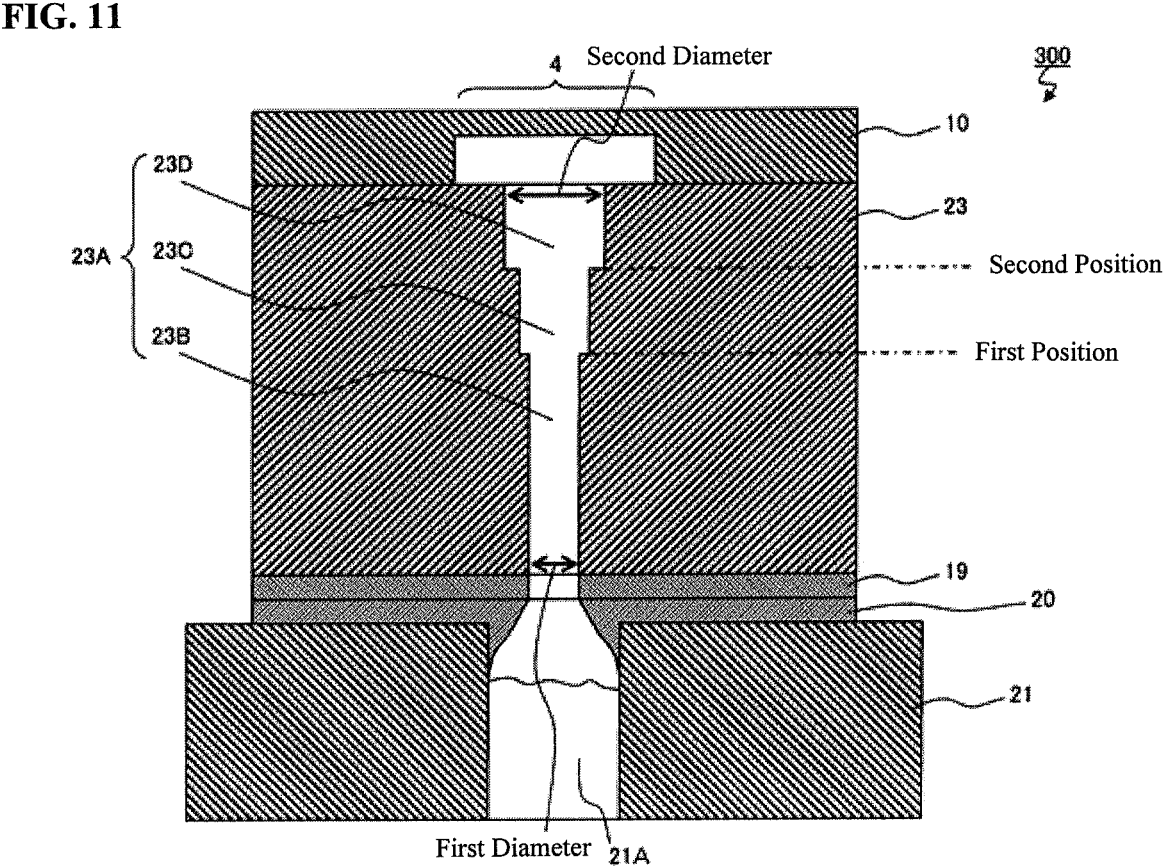
FIG. 11 is a cross-sectional diagram illustrating the structure of a pressure sensor according to further embodiment.

A pressure sensor 300 according to a further embodiment according to the present invention will be explained in reference to FIG. 11. FIG. 11 is a cross-sectional diagram illustrating the structure of the pressure sensor 300. As illustrated in FIG. 11, the pressure sensor 300 according to this embodiment is different from the pressure sensor 100 according to the above embodiment in only the structure of the glass pedestal 23, and thus identical codes are assigned to the identical structures, and explanations thereof are omitted.

For the glass pedestal 23, the bottom surface of the sensor chip 10 and the top surface of the glass pedestal 23 are bonded together. Additionally, the glass pedestal 23 is formed from Pyrex glass (registered trademark) or a ceramic, or the like. The glass pedestal 23 is bonded to the sensor chip 10 using, for example, an anode bonding method.

Additionally, a pressure introducing hole 23A is formed in the glass pedestal 23 so as to pass through the glass pedestal 23, connecting between the top and bottom surfaces of the glass pedestal 23. Additionally, the pressure introducing hole 23A is formed in a location corresponding to the differential pressure diaphragm 4 of the sensor chip 10. Additionally, the pressure introducing hole 23A connects with a ressesed portion that is formed in a location corresponding to the differential pressure diaphragm 4 of the sensor chip 10.

Here the diameter of the pressure introducing hole 23A at the bottom surface of the glass pedestal 23 is defined as the first diameter. Additionally, the diameter of the pressure introducing hole 23A at the top surface of the glass pedestal 23 is defined as the second diameter. At this time, the second diameter of the pressure introducing hole 23A is larger than the first diameter. Specifically, the pressure introducing hole 23A is formed with the first diameter from the bottom surface of the glass pedestal 23 to a first position. Additionally, the pressure introducing hole 23A is formed with the second diameter from the top surface of the glass pedestal 23 to a second position. Additionally, the pressure introducing hole 23A is formed with a diameter that is between the first diameter and the second diameter from the first position to the second position. In other words, the pressure introducing hole 23A is structured from a mutually connected first hole portion 23B, second hole portion 23C, and third hole portion 23D. Additionally, the first hole portion 23B is formed with the first diameter from the bottom surface of the glass pedestal 23 to the first position. Additionally, the second hole portion 23C is formed with a diameter that is between the first diameter and the second diameter from the first position to the second position. Additionally, the third hole portion 23D is formed with the second diameter from the top surface of the glass pedestal 23 to the second position.

Additionally, a metal thin film layer 19 is deposited on the bottom surface of the glass pedestal 23. The metal thin film layer 19 is deposited on the bottom surface of the glass pedestal 23 using a vapor deposition method or a sputtering method. In the present form of embodiment, the metal thin film layer 19 is deposited on the bottom surface of the glass pedestal 23 using a sputtering method that has superior linearity of travel of the metal particles. Although the sputtering method has superior linearity of travel of the metal particles, when the metal thin film layer 19 is deposited on the bottom surface of the glass pedestal 23, the metal thin film layer will be deposited slightly on the side walls of the pressure introducing hole 23A. However, in the pressure sensor 300 according to the present form of embodiment the pressure introducing hole 23A is formed from the first hole portion 23B, having the first diameter, at the bottom side of the glass pedestal 23 and from the third hole portion 23D, having the second diameter, which is larger than the first diameter, at the top side of the glass pedestal 23. Because of this, even though the metal thin film layer will be formed slightly on the side walls of the first hole portion 23B when the metal thin film layer 19 is deposited on the bottom surface of the glass pedestal 23, there will be essentially no metal thin film layer deposited on the side walls of the third hole portion 23D. Note that the deposition of the metal thin film layer onto the third hole portion 23D of the pressure introducing hole 23A can be prevented even if the second diameter is only slightly larger than the first diameter. Additionally, the distance from the bottom surface of the glass pedestal 23 to the first position (that is, the length of the first hole portion 23B) is a distance that is optimized based on, for example, the film thickness of the metal thin film layer 19 that is deposited on the bottom surface of the glass pedestal 23.

The pressure sensor 300 and set forth in the third form of embodiment, through structuring the pressure introducing hole 23A of the glass pedestal 23 in this way, can produce the same effects as does the pressure sensor 100 as set forth in the first form of embodiment.

Note that the present invention can be applied also to pressure sensors having strain gauges having piezoresistance effects for static pressure as well.

The invention claimed is:

1. A pressure sensor comprising:
   a semiconductor substrate comprising a diaphragm portion; and
   a glass pedestal provided on a bottom side of the semiconductor substrate;

wherein the bottom surface of the semiconductor substrate is bonded to a top surface of the glass pedestal;

a pressure introducing hole is formed in the glass pedestal so as to pass through the glass pedestal between the top surface and a bottom surface of the glass pedestal;

wherein the pressure introducing hole is formed with a first diameter for the pressure introducing hole at the bottom surface of the glass pedestal from the bottom surface of the glass pedestal to a first position, and a second diameter for the pressure introducing hole at the top surface of the glass pedestal is larger than the first diameter;

a metal thin film layer formed on the bottom surface of the glass pedestal; and a metal base having a top surface thereof bonded by solder to the bottom surface of the glass pedestal with the metal thin film layer interposed therebetween, wherein a through hole portion formed in the metal base so as to pass through the metal base between the top surface and a bottom surface of the metal base and so as to connect to the pressure introducing hole of the glass pedestal;

wherein a diameter of the through hole portion is larger than the first diameter of the pressure introducing hole; and wherein a solder fillet is formed at a step part between the through hole in the metal thin film layer and the through hole portion of the metal base.

2. A pressure sensor as set forth in claim 1, wherein:

the metal thin film layer is formed across at least a portion of a side wall, which is the side wall of the pressure introducing hole from the bottom surface of the glass pedestal, in a range from the bottom surface of the glass pedestal to the first position.

3. A pressure sensor as set forth in claim 1, wherein:

the pressure introducing hole is formed with the second diameter from the top surface of the glass pedestal to a second position.

4. A method for manufacturing a pressure sensor that comprises a semiconductor substrate having a diaphragm portion and a glass pedestal that is provided at the bottom side of the semiconductor substrate, comprising the steps of:

forming a pressure introducing hole in the glass pedestal so as to pass through the glass pedestal between a top surface and a bottom surface of the glass pedestal;

depositing a metal thin film layer on the bottom surface of the glass pedestal wherein the pressure introducing hole has been formed;

bonding the bottom surface of the semiconductor substrate together with the top surface of the glass pedestal;

wherein the pressure introducing hole forming process, the pressure introducing hole is formed from the bottom surface of the glass pedestal to a first position with a first diameter for the pressure introducing hole at the bottom surface of the glass pedestal, and a second diameter for the pressure introducing hole at the top surface of the glass pedestal is larger than the first diameter;

bonding the bottom surface of the glass pedestal together with the top surface of a metal base, using solder, with a metal thin film layer interposed therebetween;

wherein forming a through hole portion in the metal base so as to pass through the metal base between the top and bottom surfaces of the metal base and so as to connect to the pressure introducing hole of the glass pedestal;

wherein the diameter of the through hole portion is larger than the first diameter of the pressure introducing hole; and wherein in the metal base on the process, a solder fillet is formed at a step part between the through hole in the metal thin film layer and the through hole portion of the metal base.

5. A pressure sensor manufacturing method as set forth in claim 4, wherein:

in the metal thin film layer depositing process, the metal thin film layer is deposited across at least a portion of a side wall, which is the side wall of the pressure introducing hole from the bottom surface of the glass pedestal, in a range from the bottom surface of the glass pedestal to the first position.

6. A pressure sensor manufacturing method as set forth in claim 4, wherein:

in the pressure introducing hole forming the process, the pressure introducing hole is formed with the second diameter from the top surface of the glass pedestal to the a second position.

* * * * *